United States Patent Office 3,281,784
Patented Oct. 25, 1966

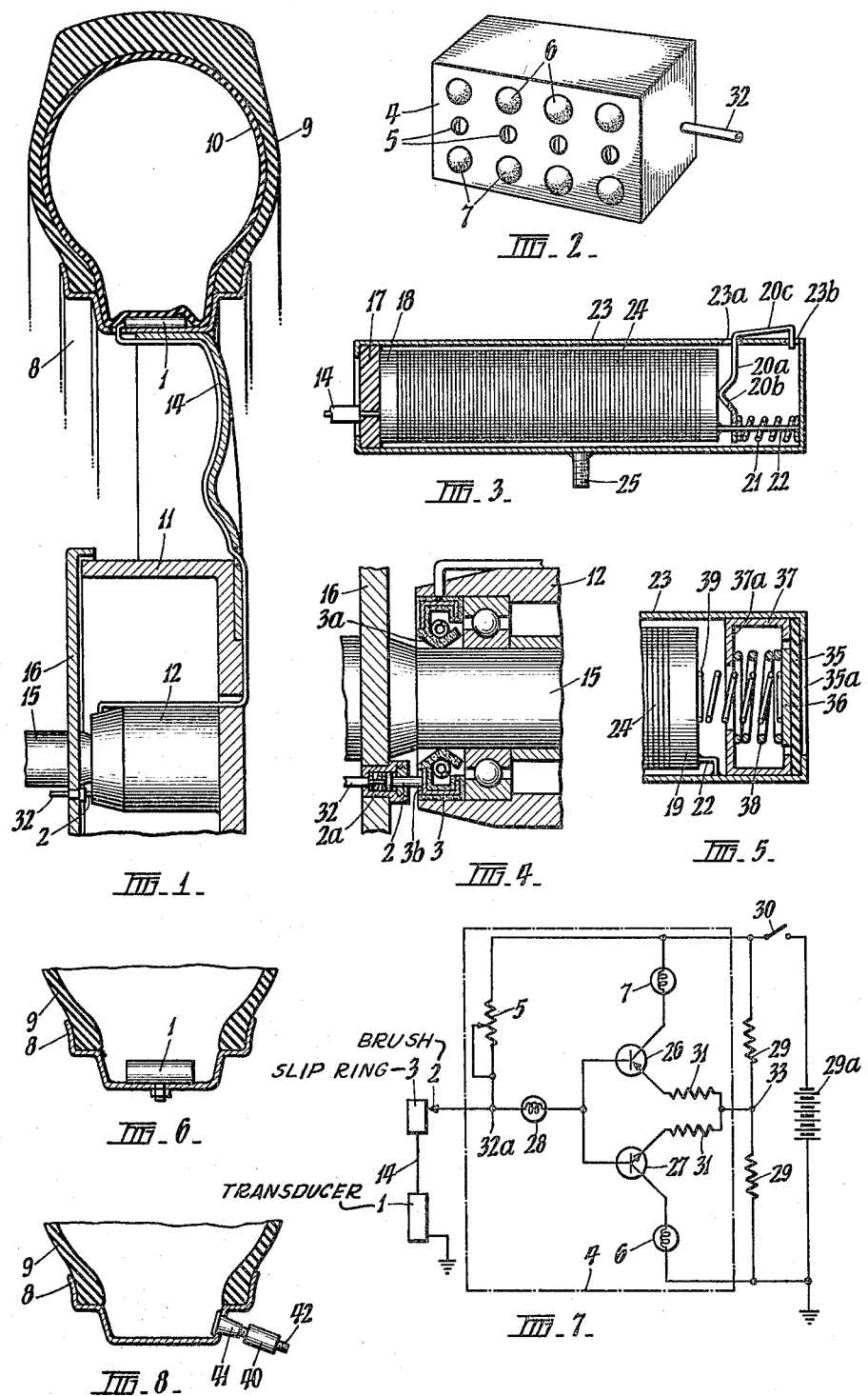

3,281,784
DEVICES FOR INDICATING PRESSURE OR TEMPERATURE CHANGES IN PNEUMATIC TIRES
Horace Edward Farthing, 12 Fletcher Parade, Burwood, Victoria, Australia
Filed May 27, 1963, Ser. No. 283,629
10 Claims. (Cl. 340—58)

This invention relates to devices for indicating pressure or temperature changes in pneumatic tires on vehicles and which devices are capable of operating while the vehicle is in motion.

It is the usual practice to inflate the pneumatic tires of automobiles and like road vehicles to a predetermined cold pressure. However, no entirely satisfactory means have been provided to give the driver of the vehicle an indication or warning that pressure or temperature conditions of any of the tires on the vehicle are abnormal whilst the vehicle is moving. It is well known that abnormal pressure and/or temperature conditions in any one tire of the vehicle is not or cannot be apparent to the driver whilst the vehicle is in motion and the occurrence of such abnormality, which may be due to loss of pressure arising from an air leak or a combination of loss of pressure and overheating of the tire arising from loss of or decreased air pressure or from overloading conditions possibly arising from the failure of one tire of dual tires. Furthermore abnormality in tire conditions in the tires of articulated vehicles may not be readily sensed by the driver in normal or straight running and such conditions only become apparent on cornering when failure or blow out of a tire or tires is often beyond the capabilities of the driver to control the vehicle to negotiate the corner without consequent danger to him and other vehicles.

The principal object of the present invention is to provide a device of convenient and economical construction for indicating pressure or temperature changes in pneumatic tires on vehicles which will give a visible or audible signal of tire operation abnormalities and which is operable while the vehicle is in motion.

According to the present invention a device for indicating pressure or temperature changes in pneumatic tires on vehicles includes a transducer in each or a selected tire or tires of the vehicle, said transducer being adapted to change its electrical resistance properties by changes of air pressure or temperature in the tire, said transducer being connected as one arm in a Wheatstone bridge circuit, the second arm of the circuit being an adjustable resistor to effect balance of the circuit under normal or predetermined air pressure or temperature conditions in the tire, the third and fourth arms of the bridge circuit constituting equal halves of an energizing current source, and with electrically operated signal means connected across the bridge circuit and adapted to be actuated when the bridge circuit is unbalanced by air pressure or temperature variations in the tire.

The transducer may comprise a carbon pile element located within the tire on the rim of the tire wheel and actuated by the tire air pressure to increase or decrease its electrical resistance according to variations in the air pressure. Alternatively the transducer may comprise an electrical resistance element included in the tire and adapted to change its resistance properties by changes of temperature of the tire or air therein.

The electrically operated signal means may comprise a centre reading galvanometer connected across the bridge circuit, the direction of deflection of the galvanometer indicating an increase or decrease in air pressure or temperature of the tire. Alternatively the signalling means may be energized by a polarized relay connected across the bridge circuit and arranged to actuate the signalling means according to the direction of current flow in the bridge circuit.

In another arrangement a transistorized circuit is connected across the bridge circuit and arranged to energize warning means according to the direction of current flow in the bridge circuit.

In order that the invention may be more readily understood reference will now be made to the accompanying drawings illustrating practical embodiments of devices for indicating pressure or temperature changes in pneumatic tires made according to the present invention. In these drawings:

FIGURE 1 is a part cross-sectional elevation of a tire, rim and wheel mounting showing position of a transducer in the well of a pneumatic tired vehicle wheel and arranged in contact with the tire tube and electrically connected through an insulated slip ring at the wheel hub;

FIGURE 2 is an illustration of an indicator box adapted to be located in the vehicle drivers' cabin, adapted to show abnormal conditions of four tires;

FIGURE 3 is a sectional elevation of the transducer shown in operational position in FIGURE 1;

FIGURE 4 is a detail sectional view showing the use of a standard bearing seal as the slip ring connection between a transducer and the indicator box;

FIGURE 5 is a detail sectional view of a modified construction of the transducer shown in FIGURE 3 and operable in a tubeless tire;

FIGURE 6 is a detail sectional view of a tubeless tire on a rim on which is mounted a transducer as shown in FIGURE 5 directly responsive to air pressure;

FIGURE 7 is a diagrammatic circuit layout of the indicator circuit for each transducer and wheel tire; and FIGURE 8 illustrates the application of transducer in the form of a strain gauge incorporated in an adapter for application to a tire valve.

As illustrated in FIGURE 1 of the drawings a transducer 1 is located in the well of the rim 8 of a vehicle wheel having pneumatic tire 9 and inner tube 10. The transducer 1 is located between the inner tube 10 and the wheel rim 8 and is adapted, in a manner to be hereinafter described, to be sensitive to variations in pressure applied to it by the said inner tube 10. Each or selected wheels of a vehicle may be furnished with a transducer 1 so that air pressure variations in every or selected wheels may be indicated.

The transducer 1 may comprise the form shown in FIGURE 3 wherein there is provided an enamel lined brass tube 23 fitted at one end with a fly lead 14 passing through an insulating gland or closure 17, in one end of said tube 23. The lead 14 is connected to a static contact block 18 of a carbon pile element within the tube 23 and which pile element consists of a number of flat carbon discs 24 located between said static contact block and a movable contact block 19. The contact 19 is connected by earthing pig-tail lead 22 to the tube 23.

The movable contact 19 is urged into contact with the carbon discs 24 by an L-shaped lever strip 20, one arm 20a is bent at 20b to a contact point substantially at the centre of the contact 19. The lever strip 20 passing through an aperture 23a in the wall of tube 23 so that the arm 20c projects from the tube 23 and junction of the arms 20a and 20c at the aperture 23a form a pivot point for the lever strip 20. The arm 20a is urged into contact with the block 19 by a light spring 21 and the outer end of arm 20c is bent inwardly to enter a second aperture 23b in the tube 23 to assist in locating the lever strip 20 in operative position. Tube pressure exerted on arm 20c of the lever strip 20 is transmitted to the pile of carbon elements 24 and the lever 20 is so dimensioned that the pressure exerted is such to produce the greatest change of resistance in the pile relative to changes in pressure in the tube 10.

The tube 23 has also fixed thereto a threaded stud 25 which is passed through an aperture in the rim to permit the tube to be bolted in position in the wheel rim 8.

An alternative arrangement of transducer suitable for tubeless tires as shown in FIGURE 6 is illustrated in detail in FIGURE 5. This arrangement is similar to that of FIGURE 4 with the exception that the lever strip 20 is replaced by a flexible diaphragm membrane 35 which is secured across an opening 35a at the end of tube 23 and is located in position by flanged retaining member 37 which is fixed within the end of the tube 23, the arrangement being such to provide an air tight seal. Pressing against the inner surface of the diaphragm is a disc 36 which is secured to a spring 38 the other inner end of which contacts the inner and fixed flange 37a of the retaining member 37. The disc 36 is also in contact with a lighter spring 39 the inner end of which contacts the movable contact block 19 of the carbon pile disc elements 24.

The diaphragm 35 is subjected to air pressure when the tube 23 is in position on the rim 8 within a tubeless tire 9 and the arrangement of springs 38 and 39 is adapted to provide that a reduced pressure, directly related to but less than the air pressure on the membrane 35, is transmitted to the carbon pile disc elements 24.

As shown in FIGURES 1 and 6 the lead 14 from the transducer 1 is suitably connected either directly or by means of plugs and sockets to an insulated slip ring 3. As illustrated in FIGURE 4 a convenient form of slip ring 3 is provided in the steel backing ring of the wheel bearing seal 3a of known type, the steel backing ring being covered with insulating material and having a bare face 3b. The slip ring 3 is connected to the lead 14 from the transducer 1 and the bare face 3b of the ring 3 is contacted with a carbon brush 2 carried in an insulated housing 2a which is mounted in a non-rotating part 16 carrying the wheel axle 15 and the wheel bearing seal 3a being carried in wheel bearing housing 12. A lead 32 connects the brush 2 to the indicator box 4 shown in FIGURE 2.

FIGURE 7 shows a diagrammatic circuit layout of the indicator circuit included in the indicator box 4 which is located in the vehicle cabin. The box 4 contains units for an indicator circuit for each wheel of the vehicle.

As illustrated in FIGURE 7 the transducer 1, lead 14, slip ring 3, brush 2 and lead 32 are connected in the circuit so as to become one arm in a Wheatstone bridge circuit. The second arm of the bridge circuit is represented by the variable resistor 5. The third and fourth arms of the bridge circuit are represented by centre tapped heavy duty resistor 29 which is required to supply a constant equal potential point 33 in the centre of the battery supply voltage represented by battery 29a.

As the subsequent operation of the indicator circuit herein described will tend to vary the current in one arm only of the bridge circuit it is necessary that the current in the two arms 29 be set at about 4 amps to maintain the voltage point 33 steadily at one half of the battery voltage.

As a centre voltage point is required for each wheel indicator circuit it is convenient for these two arms 29 to be common for all the indicator circuits to be employed.

In operation the transducer 1 is located in the wheel tire and the air pressure therein adjusted to the requirements of the tire and load. This will cause the resistance of the transducer to be decreased to a value relative to the pressure applied by the tire tube 10 on the carbon pile elements 24 through lever arm 20 or to the diaphragm 35 by the air pressure in a tubeless tire. The variable resistor 5 for each indicator circuit is then adjusted to make its resistance value equal to that of the transducer 1, and then the voltage at the junction joint 32a of resistor 5 and the transducer 1 will equal that at the centre tap 33 of resistor 29. When this condition is established an indicator would show that no current could flow between these two common voltage points.

A number of suitable indicators or detectors could be employed to illustrate any variation in the voltages at these two junction points 32a and 33. For example a centre reading galvanometer would show current flowing to or from the junction between the transducer 1 and the resistor 5 depending on whether the value of resistance in the transducer 1 decreased or increased respectively.

In a similar manner a polarized relay connected between these two junctions 32a and 33 would cause the relay to operate in one way for an increase in resistance of the transducer 1 and in the opposite direction for a decrease in resistance. Such a relay could then be employed to operate a visual or audible warning device.

As illustrated in FIGURE 7 a preferred method is the use of a complementary pair of transistors 26 and 27 of suitable characteristics connected as shown in FIGURE 8. Two indicator lamps 6 and 7, one each for high pressure and low pressure are capable of being switched by these transistors 26 and 27 if sufficient current is fed into the base connections of these transistors.

If the resistance value of the transducer 1 equals the value of resistor 5 then the voltage at the base of the transistors 26 and 27 would equal the voltage at the emitters which are connected to the centre tap 33 of resistor 29. The nature of these transistors 26 and 27 is that only a minute current of a few micro-amperes would flow in the collector circuits so that both indicator lamps 6 and 7 would not light up but would be effectively switched "off."

If the pressure acting on transducer 1 increased there would be a drop in the resistance so that the voltage across the transducer would fall (i.e. approach the ground voltage) in this case it would bias the base of transistor 27 forward so that current would flow in the base emitter diode thus causing the transistor 27 to conduct so that current would flow in the collector. This current would be a number of times larger than the current flowing in the base circuit so that a very small signal in the base would cause a current of the order of thirty (30) times greater in the collector, so that a voltage drop at the transducer 1 of 0.1 volt would cause 0.5 ma. to flow in the base and 10 ma. in the collector and through the indicator lamp 6. At this point the filament of lamp 6 would glow and show an increase of one half lb. per square inch increase in air pressure acting on the transducer 1. Similarly a drop of .2 volt or approximately 1 lb. would cause enough current to flow in transistor 27 to make the lamp 6 about half brilliance. An increase of 2 lbs. would be sufficient to cause the lamp 6 to reach full brilliance if a 40 ma. 6-volt globe was used.

Inversely a drop of tire pressure will cause the transducer to increase in resistance raising the voltage across the transducer and would in the same way bias the forward operation of the transistor 26 which would cause current to flow in the indicator lamp 7 and in this way indicate a loss of pressure in the tire.

Resistors 31 are shown as optional resistors placed in the emitter circuits of the transistors 26 and 27. Their addition will cause the emitters to follow the voltage of the base operating the relevant transistor so that the overall sensitivity of the circuit may be arranged to suit the requirements of different users.

The emitters of transistors 26 and 27 may be connected through a common resistor to junction point 33 giving each of the transistors 26 and 27 equal lowered sensitivity or conversely either one may be directly connected to the junction 33 and the other connected through a resistor. In this example suppose the emitter of transistor 26 is directly connected then a small decrease in pressure would be indicated whereas a resistor connected in the emitter of transistor 27 would reduce its sensitivity and require say five times the increase in pressure to operate the high warning indicator lamp 6. Thus a drop of 1 p.s.i. would register a low indication whereas a rise of 5 p.s.i. would be required to give a high indication.

Although the circuit as described would operate on a 12-volt positive ground installation the basic circuit would operate on a 12-volt negative ground with the function of transistors 26 and 27 being reversed. It is also possible to use voltages from 6 to 60 volts.

Lamp 28 is a fail safe device and is a ballast lamp requiring a very small increase in current to raise its resistance so that a short circuit of the transducer or circuit would tend to cause a large current to flow in the base-emitter diode of transistor 27, this large current could, if not limited, damage this diode and cause transistor 27 to switch "on" permanently. Likewise an open circuit in the transducer 1 would cause damage to transistor 26 if the base current therein was not limited, so that in this circuit lamp 28 would be a low current 6-volt lamp and is capable of limiting the base current to either transistor to a safe limit and so causing the indicator circuit to "fail safe" by indicating either an increase or decrease in tire pressure whilst at the same time protecting the equipment from damage.

The switch 30 is a master switch, which may be controlled by the ignition switch of the electrical ignition system of the vehicle. However, this supply may be switched separately by the driver if so required.

The indicator box 4 illustrated in FIGURE 2 includes the circuit units above described, with the indicator lamps 6 and 7 visible to the operator, while the adjustment for the resistors 5 of each circuit are positioned on the face of the box and associated with the lamps 6 and 7 of its relative circuit.

An alternative to the transducers above described could be achieved by employing a strain gauge included in adaptor 40 screwed into the tire valve 41 with the adaptor having a valve 42 outside the strain gauge. A more absolute reading of tire pressure could be made in this way but a two stage differential amplifier would be required for a lamp type indicator. In the same way transducer 1 may be replaced by a pressure sensitive transistor but the current to the transistor would be very small and increase the effect of slip ring variations in resistance.

The transducers described above are all adapted to show increases or decreases in pressure.

The same slip ring and indicator circuits could also be employed to measure temperature changes by substituting a thermistor, that is a negative temperature co-efficient resistor, which would give a large decrease in resistance for an increase in temperature. Such a unit mounted at the same position as shown for the transducer 1 would be capable of graduation as a change of temperature, especially if the indicator lights 6 and 7 were omitted and a centre reading galvanometer was connected between the emitters of transistors 26 and 27 and centre tap 33. Alternatively the sensing coils of $x$ and $y$ recorders may be so connected that temperature and/or pressure variations may be recorded for tire research programs.

Finally temperature conditions at extreme portions of a tire may be measured by moulding pure metal elements of fine gauge wire (pure nickel wire for example) in some part of the tire to be tested and then measuring the amplified current in the common emitter lead to indicate an increase or decrease in the temperature acting on the resistance of the wire so embedded in the tire.

Two transistors suitable for operation at 26 and 27 respectively are the Philips type AC132 PNP medium power transistor with its complementary type AC127 NPN transistor. However, any PNP and NPN pair of transistors, complementary or otherwise with approximately similar voltage characteristics would suffice for such a transistorized amplifying and indicating network.

Although the drawings illustrate an installation suitable for a four wheeled vehicle, it is apparent that the system may be applied to multi-wheeled and articulated vehicles. In this case the slip ring requirements would necessitate the provision of twin slip rings for dual wheel axles but in this case the size of the oil seals would be such as to make the provision of twin concentric slip rings a simple adaptation of the system already described. Furthermore, the provision of indicators for both wheels of a dual pair would give confirmation of the indication on each indicator. Assume a leak developed in one of a pair then its associated indicator would show a loss of pressure in that tire whilst simultaneously the added load thrown onto the tire of the other wheel would be manifested by an increase of pressure in that tire.

Experience has shown that more damage has resulted from tires bursting rather than through leaking and so the ability to record increases of pressure could be more important than a recording of a loss in pressure which could become more evident to a driver than would be the converse case.

Causes of tire pressure increases are:

(1) Increase in ambient temperature
(2) Proximity to overheated brakes
(3) Increased energy being expended in the tire by:
   (a) A rubbing brake causing excessive friction on the tire,
   (b) Misalignment of the vehicle wheels causing crabbing and consequent scruffing of tires,
   (c) Abrasion of the tire by protruding parts of the vehicle,
   (d) Underinflated tires being run at a high speed which causes excessive flexing of the tire with a build up of heat and consequently pressure.

In extreme circumstances an underinflated tire could so overheat as to cause a blow out by excessive heat raising the pressure to a dangerous level. Tires tend to equalize at a pressure required for their operation at a certain speed and although it may almost reach a safe operating pressure the heat developed in the tire may cause sufficient damage to the walls as to cause failure.

The characteristics of the carbon pile transducer herein described are such that the unit may be used to establish correct inflation of a tire if pressure gauges are not readily available, in that a tire may be re-inflated until both indicators are extinguished in which case the pressure in the tire will be the same as when the indicator was previously adjusted to that pressure.

I claim:

1. A device for indicating pressure or temperature changes in pneumatic tires on vehicles including a transducer in each or a selected tire or tires of the vehicle, said transducer being adapted to change its electrical resistance properties by changes of air pressure or temperature in the tire, a Wheatstone bridge circuit in which the transducer is connected as the first arm of the bridge circuit, a variable resistor forming the second arm of said circuit to effect balance of the circuit under normal or predetermined air pressure or temperature conditions in the tire, a centre tap resistor dividing an energizing current source into equal halves to constitute the third and fourth arms of the bridge circuit and a pair of complementary transistors connected in parallel across the bridge circuit and arranged to energize signal means in their respective collector circuits according to the direction of flow of current in the bridge circuit when the latter circuit is unbalanced by air pressure or temperature variations in the tire.

2. A device for indicating air pressure changes in pneumatic tires on vehicles including a carbon pile element in each or a selected tire or tires of the vehicle, said carbon pile element actuated by the tire air pressure to increase or decrease its electrical resistance, a Wheatstone bridge circuit, electrical connecting means connecting the carbon pile as one arm of the bridge circuit, an adjustable resistor constituting the second arm of the bridge circuit and adapted to effect balancing of the bridge circuit under normal air pressure conditions in the tire, a centre tap resistor dividing an energizing current source into equal halves to constitute the third and fourth arms of the bridge circuit, and a pair of complementary transistors connected in parallel across the bridge circuit and arranged to energize signal means in their respective collector circuits according to the direction of flow of current in the bridge circuit when the latter circuit is unbalanced by air pressure variations in the tire.

3. A device for indicating air pressure changes in pneumatic tires on vehicles as claimed in claim 2 and wherein the signal means in the collector circuits of the transistors comprise electric lamps, said lamps when energized by their respective transistors indicating an increase or decrease in air pressure in the tire.

4. A device for indicating air pressure changes in pneumatic tires on vehicles as claimed in claim 2 and wherein resistors are connected in series in the emitter circuits of the transistors to adjust the sensitivity of the transistors to variations of current flow in the bridge circuit.

5. A device for indicating air pressure changes in pneumatic tires on vehicles as claimed in claim 2 and wherein a ballast lamp is connected in series with the base circuits of the transistors to prevent large current flows to the transistors.

6. A device for indicating air pressure changes in pneumatic tires on vehicles including a transducer in each or a selected tire or tires of the vehicle, said transducer being adapted to increase or decrease its electrical resistance properties under the influence of air pressure changes in the tire, a Wheatstone bridge circuit, electrical slip ring means at the wheel but to connect the transducer as one arm of the bridge circuit, an adjustable resistor constituting the second arm of the bridge circuit and adapted to effect balancing of the bridge circuit under normal air pressure conditions in the tire, a centre tap resistor dividing an energizing current source into equal halves to constitute the third and fourth arms of the bridge circuit, and a pair of complementary transistors connected in parallel across the bridge circuit and arranged to energize signal lamps in their respective collector circuits according to the direction of flow of current in the bridge circuit when the latter circuit is unbalanced by inceases or decreases of the air pressure in the tire, and with an indicator box located in the vehicle drivers' cabin said box including the elements constituting the second, third and fourth arms of the bridge circuit, transistor circuits and signal lamps to permit the device to be operated and viewed by the driver while the vehicle is in motion.

7. A device for indicating pressure or temperature changes in pneumatic tires on vehicles including a transducer in each or a selected tire or tires on the vehicle, said transducer being adapted to change its electrical resistance properties by changes of air pressure or temperature in the tire, said transducer being connected as one arm in a Wheatstone bridge circuit, the second arm of the circuit being an adjustable resistor to effect balance of the circuit under normal or predetermined air pressure or temperature conditions in the tire, the third and fourth arms of said bridge circuit constituting equal halves of an energizing current source, and electrically operated signal means connected across said bridge circuit and adapted to be actuated when the bridge circuit is unbalanced by air pressure or temperature variations in the tire, said electrically operated signal means comprising a transistorized circuit connected across the bridge circuit and arranged to energize warning means according to the direction of current flow in the bridge circuit when the latter circuit is unbalanced by air pressure or temperature variations in the tire.

8. A device for indicating air pressure changes in pneumatic tires on vehicles including a transducer in each or a selected tire or tires of the vehicle, said transducer comprising a carbon pile element actuated by the tire air pressure to increase or decrease its electrical resistance, electrical connection means connecting said transducer as one arm in a Wheatstone bridge circuit, the second arm of said circuit being an adjustable resistor to effect balance of the circuit under normal or predetermined air pressure conditions in the tire, the third and fourth arms of said bridge circuit constituting equal halves of an energizing current source, and electrically operated signal means connected across said bridge circuit and adapted to be actuated when said bridge circuit is unbalanced by air pressure variations in a tire, said carbon pile element being located between the rim of the tire wheel and the tire tube and including lever means actuatable by the tube to increase or decrease the electrical resistance of said carbon pile according to an increase or decrease of air pressure in the tire tube.

9. The device for indicating air pressure changes in pneumatic tires of claim 8 in which said carbon pile element is enclosed within a metallic tube, and said lever means is positioned in said metallic tube in contact with said carbon pile element whereby pressure exerted on said lever means by a change in the air pressure in said tire will change the electrical resistance of said carbon pile element.

10. A device for indicating air pressure changes in pneumatic tires on vehicles including a transducer in each or a selected tire or tires of the vehicle, said transducer comprising a carbon pile element actuated by the tire air pressure to increase or decrease its electrical resistance, electrical connection means connecting said transducer as one arm in a Wheatstone bridge circuit, the second arm of said circuit being an adjustable resistor to effect balance of the circuit under normal or predetermined air pressure conditions in the tire, the third and fourth arms of said bridge circuit constituting equal halves of an energizing current source, and electrically operated signal means connected across said bridge circuit and adapted to be actuated when said bridge circuit is unbalanced by air pressure variations in a tire, said carbon pile element being located on the rim and within a tubeless pneumatic tire, a closed tube containing said carbon pile element, and a flexible diaphragm in said tube adapted to apply pressure to said carbon pile element according to the air pressure in the tire.

References Cited by the Examiner
UNITED STATES PATENTS

| 1,581,320 | 4/1926 | Pumphrey | 340—58 X |
| 2,033,424 | 3/1936 | Gieskieng | 340—58 |
| 2,442,104 | 5/1948 | Twombly | 340—58 X |
| 2,669,876 | 2/1954 | Lentz | 340—58 X |

NEIL C. READ, *Primary Examiner.*

THOMAS B. HABECKER, *Examiner.*

A. H. WARING, *Assistant Examiner.*